E. HALL.

Assignor to THE HALL ROLLER SKATE COMPANY.

ROLLER SKATE.

No. 10,664. Reissued Nov. 24, 1885.

Witnesses:
Mary E. Woodbum.
John T. Kennedy

Inventor
Edgar Hall

N. PETERS, Photo-Lithographer, Washington, D. C.

UNITED STATES PATENT OFFICE.

EDGAR HALL, OF CAMBRIDGE, MASSACHUSETTS, ASSIGNOR TO THE HALL ROLLER SKATE COMPANY, OF NASHUA, NEW HAMPSHIRE.

ROLLER-SKATE.

SPECIFICATION forming part of Reissued Letters Patent No. 10,664, dated November 24, 1885.

Original No. 305,919, dated September 30, 1884. Application for reissue filed June 5, 1885. Serial No. 167,781.

*To all whom it may concern:*

Be it known that I, EDGAR HALL, of Cambridge, in the county of Middlesex, State of Massachusetts, have invented certain new and useful Improvements in Roller-Skates, of which the following is a description sufficiently full, clear, and exact to enable any person skilled in the art or science to which said invention appertains to make and use the same, reference being had to the accompanying drawings, forming a part of this specification, in which—

Figure 1:
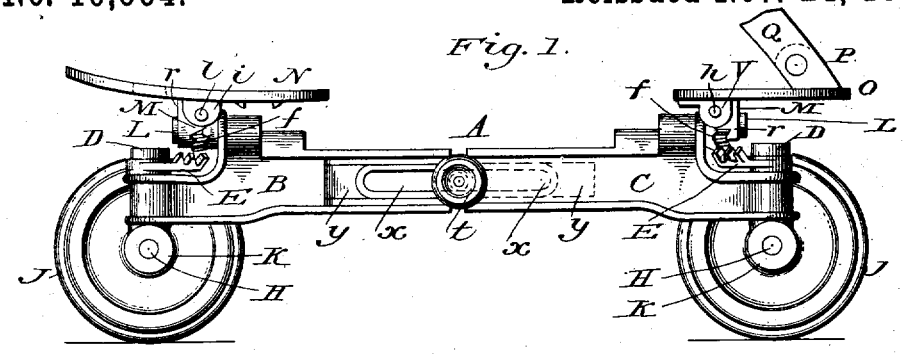
Figure 2:
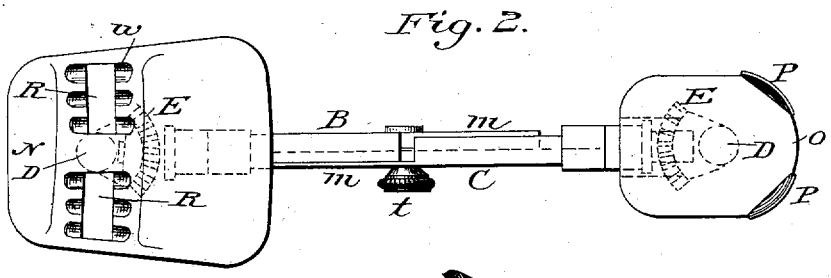
Figure 3:
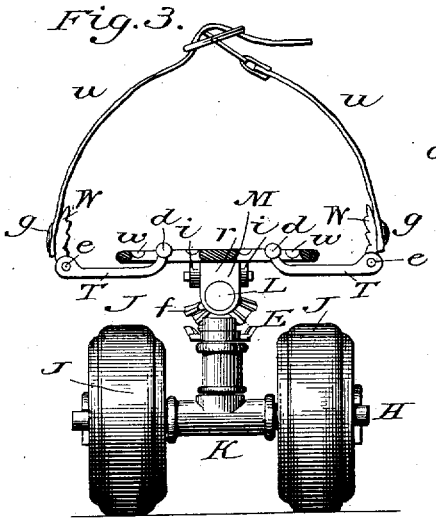
Figure 4:
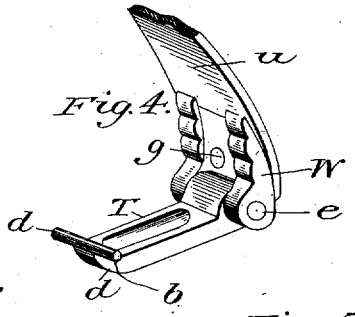
Figure 5:
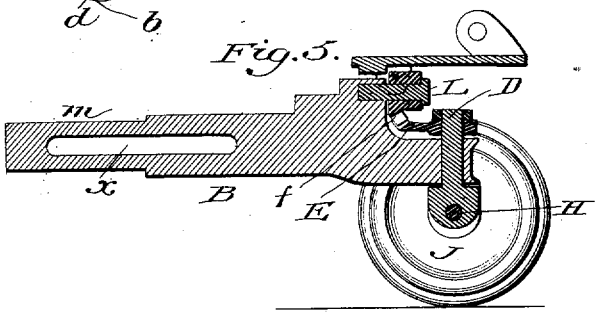

Figure 1 is a side elevation of my improved skate with two of the rollers removed; Fig. 2, a top plan view of the same with all of the rollers removed; Fig. 3, a view showing the forward pair of rollers and clamps in end elevation, the toe-piece being represented in vertical transverse section; Fig. 4, a perspective view of one of the clamps detached, its strap being represented as broken off; and Fig. 5, a vertical longitudinal section of the forward portion of the skate.

Like letters of reference indicate corresponding parts in the different figures of the drawings.

My invention relates to the class of skates known as "roller" or "parlor" skates; and it consists in a novel construction and arrangement of the parts, as hereinafter more fully set forth and claimed, by which a more desirable and effective article of this character is produced than is now in ordinary use.

The nature and operation of the improvement will be readily understood by all conversant with such matters from the following explanation.

In the drawings, A represents the body or frame of the skate, which connects the forward and rear trucks, and to and upon which are pivoted the oscillating foot-supports. The body or frame does not tilt or rock, but constantly maintains the same angular relation to the plane of the surfaces passed over by the rollers, so that the vertical line of the body of the skate is always at right angles to the plane of said surfaces, whatever may be the position of the rollers, whether turned to the right or to the left.

In order to render the body or frame extensible, it may be divided into two portions or sections, B C. When so divided, each of these sections is provided with an elongated groove, *x*, and with a narrower projection or tongue, *m*, which is adapted to fit a corresponding groove, *y*, in the side of the opposite section, the two sections being united or clamped together by the nut and bolt *t*, by which the body of the skate is rendered extensible. Journaled vertically in the outer end of either of said sections there is a stud, D, having at its upper end the inwardly-projecting segment or rack E, and at its lower end the cross-head K, in which the axle H, carrying the rollers J, is journaled. Projecting horizontally toward the outer end of either of said sections B C there is a stud, L, and journaled to partially rotate on said stud there is a collet or sleeve, M, provided with an upwardly-projecting flange, *r*, and on its lower side with a series of teeth, *f*, adapted to intermesh with the teeth on the segment E. A toe-piece, N, provided with two downwardly-projecting flanges, *i*, is pivoted to the flange *r* on the collet M of section B by means of the pivot *l*, said toe-piece being adapted to rock or tilt both longitudinally and laterally or endwise and sidewise. A heel-piece, O, provided with two downwardly-projecting flanges, *v*, is pivoted at *h* to the collet M of section B in substantially the same manner as the toe-piece N, and provided with an upwardly-projecting flange, P, at either side for attaching the heel-straps Q. The toe-piece is provided with two elongated transversely-arranged slots, R, and with a series of indentations or notches, *w*, along either side of said slots on the upper side of the toe-piece. A bar, T, having its inner end, *b*, curved upwardly, and provided with the lateral projections or studs *d*, is jointed to either toe-strap U by means of the short serrated arm W and joint-pin *e*, the arm being riveted to the strap at *g*. The width of the slots R is slightly greater than that of the arms T, and the arms are inserted in said slots from below, the toe-piece being turned edgewise to permit the entrance of the studs *d*, after which they are adjusted, as shown in Fig. 3, with the studs resting in the grooves *w* on either side of the slots.

It will be obvious that the bars T and arms or levers W form a clamp adapted to grasp the sole of the boot or shoe of the wearer of the skate, and thus securely fasten the skate to the foot; also, that the bars T may be moved out or in with respect to the center of the toe-piece to adjust the clamp to any size of boot or shoe.

The object of the toothed collets and racks and their immediately-connected parts is to enable the rollers to be inclined to the longitudinal axial line of the body of the skate in accordance with the inclination of the heel and toe pieces. For instance, if the foot is inclined to the left in turning a curve from right to left, the toe and heel piece will also be correspondingly inclined to the left, the collets M turning on the studs L as these pieces are tilted laterally. The action, however, of the toe-piece on the forward pair of rollers will be precisely the reverse of that of the heel-piece on the rear pair of rollers, for the reason that the forward rack or segment, E, stands at the rear of the central axial line of the forward stud D, while the rear rack is disposed forward of the central axial line of the rear stud D, the result being that when the heel and toe pieces are both tipped to the left the forward rollers will be correspondingly turned to the left, but the rear ones will be turned to the right, thereby causing the skate to traverse through the arc of a circle the diameter of which will be great or small in accordance with the degree to which the toe and heel pieces are inclined.

By having the gears which operate to turn the rollers placed near to the pivot on which the foot-supports rock or tilt, the operator can cause the rollers to swivel with much greater ease and precision than he could do if the gears were placed nearer to the rollers.

It will be obvious that by having the rollers adapted to follow the exact line of the curve or circle in which the skater is moving, much less exertion will be required in turning curves on the skates than would otherwise be necessary; also, that the skate may be turned to the right or left with equal facility.

I do not confine myself to constructing and arranging the heel and toe pieces in such a manner as to rock endwise; neither do I confine myself to making the body of the skate in two sections or extensible, nor to the use of the adjustable clamp described for securing the toe-piece to the boot or shoe, as all of these features may be varied or substituted by others without entirely departing from the spirit of my improvement. The teeth of the segment E may also be arched or curved laterally, the teeth on the collet M being correspondingly curved, if desired.

Having thus explained my invention, what I claim is—

1. In a roller-skate having a non-tilting body or frame, oscillating foot-supports provided with gears, in combination with swiveling trucks, the swivel-pins of which are provided with suitable racks to intermesh therewith, substantially as and for the purpose shown and described.

2. In a roller-skate, the body A, rendered extensible by the slots *x*, projections *m*, bolt and nut *t*, and grooves *y*, in which said projections rest, substantially as described.

3. In a roller-skate, the toe-piece N, provided with the slots R and grooves or notches *w*, in combination with the bars T, studs *d*, jointed levers W, and straps U, combined and arranged to operate substantially as set forth.

4. The improved roller-skate herein described, the same consisting of the sections B C, provided with the studs L, projections *m*, and slots *x*, the toe-piece N, provided with the slots R, notches *w*, and flanges *i*, the collets M, provided with the teeth *f* and flanges *r*, the studs D, provided with the toothed segments E and cross-heads K, the axles H, carrying the rollers J, the bars T, provided with the studs *d*, jointed levers W, and straps U, the heel-piece O, provided with the flanges *v* P and straps Q, and the bolt and nut *t*, constructed, combined, and arranged to operate substantially as described.

EDGAR HALL.

Witnesses:
MARY E. WOODBURN,
JOHN T. KENNERK.